US00RE41488E

(19) United States
(12) Reissued Patent
Malik

(10) Patent Number: US RE41,488 E
(45) Date of Reissued Patent: Aug. 10, 2010

(54) METHODS AND SYSTEMS FOR USING THE PUBLIC SWITCHED TELEPHONE NETWORK TO CONDUCT A TRANSACTION BETWEEN CUSTOMER ACCOUNTS

(76) Inventor: Dale W Malik, 1035 Redfield La., Dunwoody, GA (US) 30338

(21) Appl. No.: 11/723,812

(22) Filed: Mar. 22, 2007

Related U.S. Patent Documents

Reissue of:
(64) Patent No.: 6,873,691
Issued: Mar. 29, 2005
Appl. No.: 09/287,023
Filed: Apr. 6, 1999

(51) Int. Cl.
*H04M 15/00* (2006.01)

(52) U.S. Cl. ..... 379/114.28; 379/126
(58) Field of Classification Search ..... 379/111, 379/112.01, 114.01, 114.03, 114.21–114.23, 379/114.27–119, 121.03, 126, 127.01, 127.03–127.05, 379/133, 134
See application file for complete search history.

(56) References Cited

U.S. PATENT DOCUMENTS

| | | | |
|---|---|---|---|
| 5,003,584 | A | 3/1991 | Benyacar et al. |
| 5,430,719 | A | 7/1995 | Weisser, Jr. |
| 5,511,113 | A | 4/1996 | Tasaki et al. |
| 5,991,749 | A | 11/1999 | Morrill, Jr. |
| 6,029,151 | A | 2/2000 | Nikander |
| 6,185,545 | B1 | 2/2001 | Resnick et al. |
| 6,333,976 | B2 | 12/2001 | Lesley |
| 6,424,706 | B1 | 7/2002 | Katz et al. |

FOREIGN PATENT DOCUMENTS

| | | | |
|---|---|---|---|
| EP | 0 848 361 | A1 | 6/1996 |
| WO | 97/29584 | A1 | 8/1997 |
| WO | 97/30543 | A1 | 8/1997 |

*Primary Examiner*—Quoc D Tran
(74) *Attorney, Agent, or Firm*—Connolly Bove Lodge & Hutz LLP

(57) ABSTRACT

Methods and systems for using a communication to execute a transaction with respect to an account. A communication is received on a calling line associated with a calling line number. An account number and a transaction amount are obtained from the communication. The account number corresponds to an account with respect to which a transaction is to be conducted. The transaction amount may be a number of units, a dollar amount, etc. A validation may be carried out to determine whether the caller or calling line number is authorized with respect to the conduct of the transaction. In an exemplary embodiment, a billing message is created to include the account number, the transaction amount, and the calling line number. The account number and the transaction amount from the billing message are used to execute the transaction with respect to the account corresponding to the account number. The transaction may be executed by crediting the account by the transaction amount such as by at least the number of units or by at least the dollar amount and by debiting the calling line number account by at least the number of units or by at least the dollar amount. The communication may be provided with an announcement regarding the execution of the transaction.

68 Claims, 6 Drawing Sheets

| TELECOMMUNICATIONS INVOICE FOR NORA'S ACCOUNT | | | 80 |
|---|---|---|---|
| MONTHLY CHARGE FOR TELECOMMUNICATIONS SERVICE PROVIDED TO NORA'S CALLING LINE NUMBER | | DEBIT $30.00 | 82 |
| HAPPY BIRTHDAY FROM DALE | CREDIT $50.00 | | 84 |
| PAST DUE | | DEBIT $20.00 | 86 |
| | AMOUNT NOW DUE - $0 | | 88 |

FIG. 4A

| TELECOMMUNICATIONS INVOICE FOR DALE'S ACCOUNT | | 90 |
|---|---|---|
| MONTHLY CHARGE FOR TELECOMMUNICATIONS SERVICE PROVIDED TO DALE'S CALLING LINE NUMBER | DEBIT<br>$30.00 | 92 |
| TRANSACTION SERVICE ACTIVITY:<br>CREDIT TO NORA'S ACCOUNT<br>(MESSAGE: HAPPY BIRTHDAY)<br>SERVICE CHARGE | DEBITS<br>$50.00<br><br>$1.00 | 94 |
| TRANSACTION SERVICE ACTIVITY:<br>1 ORDER OF STEAK KNIVES<br><br>SERVICE CHARGE | DEBITS<br>$30.00<br><br>$1.00 | 96 |
| AMOUNT NOW DUE - | $112.00 | 98 |

FIG. 4B

METHODS AND SYSTEMS FOR USING THE PUBLIC SWITCHED TELEPHONE NETWORK TO CONDUCT A TRANSACTION BETWEEN CUSTOMER ACCOUNTS

Matter enclosed in heavy brackets [ ] appears in the original patent but forms no part of this reissue specification; matter printed in italics indicates the additions made by reissue.

FIELD OF THE INVENTION

This invention generally relates to the fields of telecommunications and electronic commerce, and particularly, relates to the use of a billing message that is generated in connection with a communication in the public switched telephone network (PSTN) and that is used to provide information relating to the execution of a transaction between customer accounts.

BACKGROUND OF THE INVENTION

Assume your son or daughter is away at college, and as a student usually does, runs a little short of cash. Parents generally find out about such a cash shortage in a telephone call from the student. It would be nice to fix or alleviate that cash shortage through something as easy as a telephone call such as the call that brought the news of the cash shortage. But conventional methods of funds transfer generally are not so simple.

One method a parent may use to help a student's cash flow is to hand cash directly to the student on the student's next visit home. But such hand delivery may not come quickly enough for the student's situation. Another method the parent may use is to mail or otherwise have a check delivered to the student. Again, such mail or other delivery may not be quick enough for the student's situation. Yet another method the parent may use is to wire transfer funds through some service such as Western Union or other money transfer service. Like hand, postal or other delivery, such wire transfer of funds may not be quick enough for the student's situation.

College students are not the only ones who may need an infusion of cash from time to time. Aging parents, incapacitated relatives, and friends caught in a bind may need a little extra cash now and then. Often, the people in need of cash have waited until the last possible moment to make what is to them an embarrassing appeal for the money. Thus, when the request is granted, the money needs to be transferred on an efficient and expedited basis.

To provide a money transfer on an efficient and expedited basis, it would be helpful if the transfer could be accomplished in as secure a manner as possible so as to be certain of the money being transferred to the appropriate person. Further, it would be helpful if the transfer could be accomplished with a minimum amount of time and effort expended on details such as setting up or otherwise establishing an account for the donor or for the recipient. It also would be helpful if the transfer could be made from and to a convenient location so that, respectively, the donor and the recipient, do not have to waste valuable time and effort in travel with respect to the execution of the transaction. In addition, it would be helpful if the transfer could be made at any time so the donor and the recipient do not have to waste time in waiting for selected hours of operation. Further, it would be helpful if the transfer could be accomplished easily through the use of simple, known technology so that neither the donor nor the recipient needs to expend time and effort in learning and in using a new or complicated technology.

Finally, it would be helpful if the cost of the transfer is minimal to the donor and the recipient.

SUMMARY

College students, aging parents, incapacitated relatives, and friends caught in a bind generally have in common among themselves and with others a telephone and an associated telephone account with a telecommunications service provider. In fact, the telecommunications accounts of a telecommunications service provider correspond to a very large pool of customers who are linked by telecommunications service. The pool of customers linked by telecommunications service typically is bigger than a pool of customers of other enterprises such as banks, or other retailers. The common link of telecommunications service is used advantageously by the present invention to provide a funds transfer service or other transaction service for use by customers of the service provider. Given the very large pool of customers of a typical service provider, the transaction service allows for transactions between people of a very large group of people or enterprises.

Stated generally, the present invention includes methods and systems for using the public switched telephone network (PSTN) to conduct a transaction with respect to an account. A caller may use a communication in the PSTN to effectively "charge" a transaction to his or her telephone number. Further, the caller may use the communication to provide information with respect to the transaction and have the transaction carried out based on the information provided. For example, the caller may make a call to have another person's account credited with a dollar amount and may effectively pay for that credit through a debiting of the caller's account.

Advantageously, the exemplary methods and systems allow a caller to have a transaction executed quickly and with confidence in the security of the transaction. A caller may initiate the execution of a transaction on short notice. In addition, the caller may conveniently initiate the execution of the transaction through simply placing a communication in the PSTN. Further, the caller may charge the transaction to his or her telephone account (calling line number account) and incur little or no fee for the transaction. The recipient of the transaction may receive a credit to his or her account from the caller without the recipient having to pay a service fee.

More particularly, an exemplary method allows for using a communication in the PSTN to execute a transaction with respect to an account. A communication is received in the PSTN on a calling line associated with a calling line number. The communication may have been dialed or directed to a special access code or to a preselected dialed number. An account number and a transaction amount are obtained from the communication. The account number corresponds to an account with respect to which a transaction is to be conducted. The account number may differ from a calling line number account associated with the calling line number. The transaction amount may be a number of units, a dollar amount, etc.

A validation may be carried out to determine whether the calling line number is authorized with respect to the conduct of the transaction. The validation may include obtaining a personal identification number (PIN) from the communication and checking that the PIN corresponds to a stored PIN associated with the calling line number. The validation may include comparing the account number for correspondence to a stored account number associated with the calling line number.

In this exemplary embodiment, a billing message may be created to include the account number, the transaction amount, and the calling line number. The account number and the transaction amount from the billing message are used to execute the transaction with respect to the account corresponding to the account number. The transaction may be executed by crediting the account by the transaction amount such as by at least the number of units and/or by at least the dollar amount. The transaction also may be executed by debiting the calling line number account by at least the number of units and/or by at least the dollar amount, plus a fee for the transaction. The communication may be provided with an announcement regarding the execution of the transaction.

Another exemplary method for using a communication to conduct a transaction with respect to an account may be used in a telecommunications system associated with the PSTN. Pursuant to this embodiment, the telecommunications system functionally interconnects at least a service switching point, a service control point, and an intelligent network element. The telecommunications system also includes a billing system functionally connected at least to the service control point. The billing system includes accounts for conducting transactions. The accounts may be telecommunications accounts for charging fees to subscribers with respect to telecommunications services provided to the subscribers. The billing system also may include other accounts.

Per this exemplary embodiment, a communication is received in the PSTN at the service switching point. The communication is associated with a calling line number. The service switching point routes the communication to the intelligent network element. The intelligent network element obtains an account number and a transaction amount from the communication. The account number corresponds to the account with respect to which the transaction is to be conducted in the billing system. Generally, the account number is a different account number from a calling line number account corresponding to the calling line number associated with the communication received at the service switching point. The transaction amount may include a number of units, a dollar amount, or other representation with respect to the desired transaction.

In response to obtaining the account number and the transaction amount, the intelligent network element provides the account number, the transaction amount, and the calling line number associated with the communication to the service control point. The service control point may carry out a validation to determine whether the calling line number is authorized with respect to the conduct of the transaction. For example, the intelligent network element may have obtained or the service control point otherwise may have obtained a personal identification number (PIN) from the communication. The validation may include a comparison of the PIN for correspondence to a stored PIN associated with the calling line number. The validation may include a comparison of the telecommunications account number for correspondence to a stored telecommunications account number associated with the calling line number.

The service control point may take the account number, the transaction amount, and the calling line number available to the billing system by including the account number, the transaction amount, and the calling line number in a billing message and by posting the billing message for retrieval or obtaining by the billing system. The billing system may retrieve or obtain the account number, the transaction amount, and the calling line number by obtaining the billing message posted by the service control point.

The billing system conducts the transaction with respect to the account associated with the account number by crediting the account by at least the transaction amount. For example, the billing system may conduct the transaction by crediting the telecommunications account by at least the number of units or by at least the dollar amount provided in the transaction information or transaction amount. The billing system also may conduct the transaction by debiting the calling line number account by at least the transaction amount.

In addition, the service control point may provide a confirmation regarding the conduct of the transaction to the intelligent network element. In turn, the intelligent network element may provide an announcement to the communication regarding the transaction.

Thus, pursuant to this embodiment, the transaction is conducted by the billing system by using the account number and the transaction amount provided by the communication and made available to the billing system by the intelligent network element and the service control point in order to credit the account corresponding to the account number in the billing system by at least the transaction amount.

An additional exemplary embodiment of the present invention provides a method to conduct a transaction with respect to a telecommunications account. This exemplary method may be used in a system for billing fees to subscribers for the provision of telecommunications services. In this system, each subscriber has a telecommunications account in the system. The telecommunications account is associated with at least one calling line number. The billing system may include other accounts.

In this exemplary method, a billing message is obtained that is generated as a result of a telecommunications service performed with respect to a calling line number. A determination is made that the billing message includes an indication that a transaction is to be conducted with respect to a telecommunications account in the system. The indication may constitute transaction information. In response to the determination, a transaction then is conducted with respect to the telecommunications account. The transaction may be conducted by using the transaction information with respect to the telecommunications account. For example, the transaction may be conducted by crediting the telecommunications account by at least a number of units and/or a dollar amount, and/or debiting a different telecommunications account by at least the number of units and/or by at least the dollar amount. The different telecommunications account may be associated with the calling line number receiving the telecommunications service that generated the billing message.

In addition, in this exemplary embodiment and other embodiments, an invoice may be generated for the telecommunications account wherein the invoice indicates the conduct of the transaction with respect to the telecommunications account. The invoice may indicate a message with respect to the transaction. Further, a different invoice may be generated for the different telecommunications account. The different invoice may indicate the conduct of the transaction with respect to the telecommunications account. The different invoice may indicate a different message relating to the transaction.

A further exemplary embodiment of the present invention may be operated in a telecommunications system wherein a billing message is created with respect to a communication. The billing message is further created with respect to a calling line number account corresponding to a calling line number associated with the communication. The billing message is obtained by a billing system having access to the calling line number account and to other accounts. The exemplary method executes a transaction in the billing system between the calling line number account and one of the other accounts to which the billing system has access.

Per this exemplary method, the billing message includes an indication for the execution of the transaction. The indication may be the inclusion of transaction information. The billing system makes a recognition of the indication in the billing message. In response to the indication in the billing message, the billing system executes the transaction between the calling line number account and the one of the other accounts. The billing system may execute the transaction by using the transaction information such as by crediting the one of the other accounts by at least a number of units or a dollar amount, and/or by debiting the calling line number account by at least the number of units and/or by at least the dollar amount. The billing system may further execute the transaction by debiting the calling line number account by a service fee for the transaction.

In sum, the exemplary embodiments of the present invention provide methods and systems for using a communication in the PSTN to conduct a transaction with respect to an account. The transaction may be executed on a secure, efficient, and expedited basis through the use of a communication in the PSTN as the initiator of the execution of the transaction. The transaction may be initiated conveniently and securely through the use of a telephone call, while saving time and money over conventional methods. The transaction may be initiated by placing a call at any time so that the donor and recipient do not have to waste time in waiting for selected hours of operation. Further, it is helpful the transaction can be accomplished easily through the use of simple, known technology in the form of placing a communication in the PSTN so that neither the donor nor the recipient needs to expend time and effort in learning and in using a new or complicated technology. It also is an advantage the cost of the transaction is minimal to the donor and recipient.

Finally, the very large pool of customers of a telecommunications service provider advantageously allows a customer to make use of the service with respect to very many different people, enterprises, and transactions.

BRIEF DESCRIPTION OF THE DRAWINGS

FIGS. 4A–4B illustrate exemplary invoices such as may be used with exemplary embodiments of the present invention.

DETAILED DESCRIPTION

The present invention includes methods and systems for using a communication in the public switched telephone network (PSTN) to conduct a transaction with respect to an account. The particular embodiments described herein are intended in all respects to be illustrative rather than restrictive. Alternative embodiments will become apparent to those skilled in the art to which the present invention pertains without departing from its spirit and scope.

Figure 1:
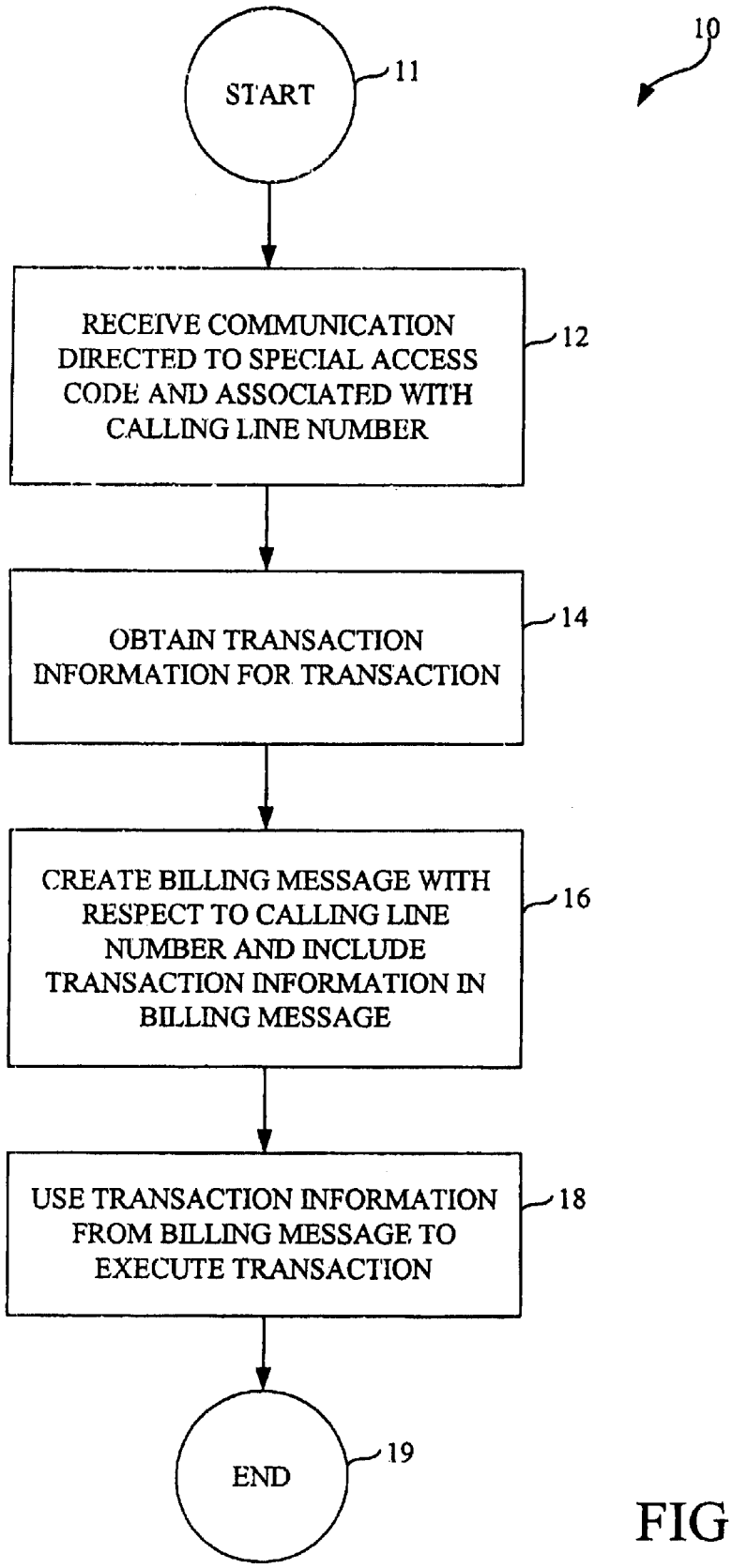
FIG. 1 is a block diagram illustrating an exemplary method of operation of the present invention.

Overview of an Exemplary Embodiment—FIG. 1

Generally, the present invention provides a caller with methods and systems for a transaction service that may conduct a transaction with respect to an account through the use of a communication in the PSTN. The use of the communication may generate a billing message, which is used to provide transaction information relating to the conduct of the transaction. The transaction may include such actions as crediting an account with a number of units or with a dollar amount. The transaction also may include debiting an account associated with the calling line number by the number of units or with the dollar amount that was credited to the other account. Further, the transaction may include additional or substitute actions with respect to the account identified in the billing message and/or the account associated with the caller.

FIG. 1 is a flow diagram illustrating an exemplary method 10 of operation of a transaction service of the present invention. After start step 11, in step 12 a special access code and a calling line number are received in connection with a communication in the PSTN. In the alternative, a dialed number rather than a special access code may be received in connection with a communication. Generally, the communication is directed to the special access code or to the dialed number by the caller dialing, respectively, the special access code or the dialed number from a calling line that is associated with the calling line number. By direction of the communication to the special access code or to the dialed number, the caller provides an indication of a request for use of the transaction service so as to initiate the conduct of a transaction with respect to an account.

In contrast to the special access code or the dialed number, the calling line number is received or obtained in connection with a communication on the basis of the calling line number being associated with the calling line on which the communication is placed. Further, by placing the communication on a calling line associated with the calling line number, the caller provides an indication that the account associated with the calling line number (i.e., calling line number account) may be involved in the transaction.

In step 14 in FIG. 1, transaction information for the transaction may be obtained from the communication and/or the caller. Transaction information may include any type of information relevant to the transaction to be conducted. Transaction information may include one or more account numbers, numbers of units or dollar amounts involved in the transaction, dates and/or times for the transaction, identities of parties that may be involved in the transaction, messages associated with the transaction, and the like.

In step 16, a billing message may be created with respect to the calling line number associated with the calling line on which the communication is placed. In other words, a billing message may be created with respect to the calling line number account. Advantageously, the billing message may include all or part of the transaction information obtained from the caller and/or the communication. For example, the billing message may be created to include an identification of the account and/or the number of units that are to be involved in the transaction. Alternatively, another message, source or other way of including all or part of the transaction information may be created in place of the billing message.

In step 18, the transaction information from the billing message (or other message, source, or other) is used to execute the transaction. Assume for example the billing message includes an account number and a number of units as transaction information. This transaction information then may be used to credit the account associated with the account number by the number of units. After the transaction is executed, the exemplary method ends in step 19.

Advantageously, the exemplary methods and systems allow a caller to have a transaction executed quickly, conveniently, and securely through simply placing a communication in the PSTN. Further, the caller has the option of charging the cost of the transaction to the caller's account (calling line number account). Additional advantages of the present invention are discussed below.

Figure 2:
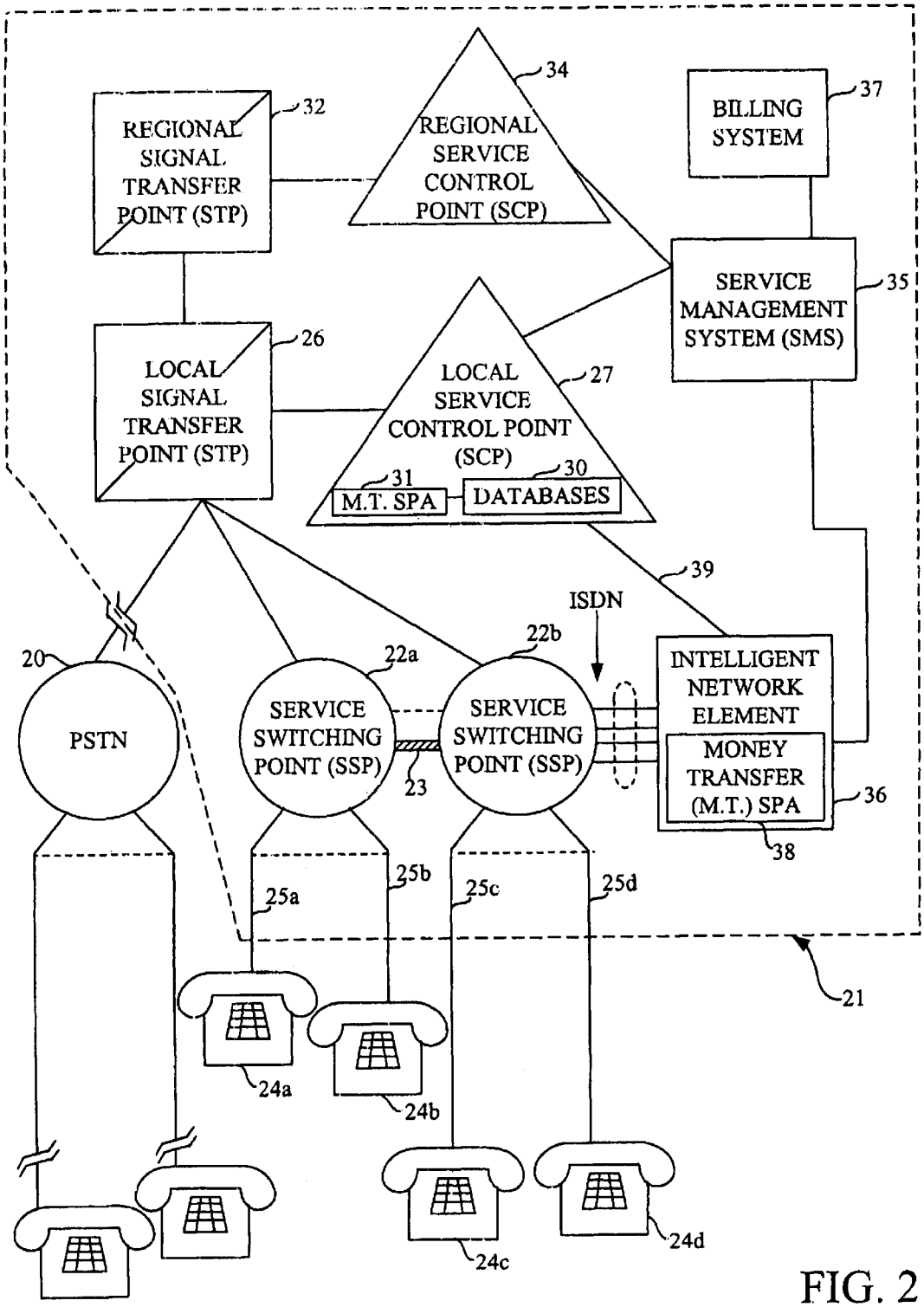
FIG. 2 is a diagram of an exemplary embodiment and exemplary environment for operation of the present invention.

Overview of AIN Elements—FIG. 2

FIG. 2 is a diagram of an exemplary embodiment and exemplary environment for operation of the present invention. Connected to and generally part of the public switched telecommunications network (PSTN) 20, an exemplary environment is an Advanced Intelligent Network (AIN) 21. For brevity, only a basic enabling explanation of the AIN 21 is provided herein. Where the AIN 21 operates or is composed differently from that which would be understood by those skilled in the art, additional details are provided. For further information regarding the AIN 21 and aspects thereof, the interested reader is referred to the patent to Weisser, U.S. Pat. No. 5,430,719, which is incorporated herein by reference. *As discussed in Weisser, for example, various AIN components may typically be implemented in the form of computers or switches that may be programmed to perform various functions; thus, such components may typically include executable instructions on various computer-readable media (for example, computers and computer-based switches inherently include memory for storing such instructions; however, the invention is not thus limited*).

The AIN 21 includes a variety of interconnected network elements. A group of such network elements includes the plurality of central offices which are indicated as service switching points (SSPs) 22a, 22b in FIG. 2. An SSP typically includes switch functionality, but also includes other functionality so as to communicate with other AIN elements. As further illustrated in FIG. 2, the SSPs 22a, 22b have a plurality of subscriber lines 25a, 25b, 25c, and 25d, connected thereto. A subscriber line also may be referred to as a calling line. Each SSP serves a designated group of calling lines, and thus, the SSP that serves a particular calling line may be referred to as its serving SSP. Each calling line is connected typically to a piece of terminating equipment respectively including a plurality of telephones commonly referenced as 24 and individually referenced as 24a, 24b, 24c, and 24d. Although telephones are illustrated as the pieces of terminating equipment in FIG. 2, such pieces may include other telecommunication devices such as facsimile machines, computers, modems, etc.

Each active calling line in an AIN 21 is assigned a calling line number typically having ten digits. The term "calling line number" is used herein in its generally understood meaning to be the number which is dialed or input by a caller or source to reach a piece of terminating equipment on a calling line associated with the calling line number that has been dialed or input by the caller. A calling line number is commonly referred to as a telephone number or a directory number.

Referring again to FIG. 2, SSPs 22a, 22b are interconnected by a plurality of trunk circuits 23. These are the voice path trunks that interconnect the SSPs to connect communications. The term "communication" or "call" is used herein to include all messages that may be exchanged between a caller and a called party (or between or among pieces of terminating equipment) in the network illustrated in FIG. 2. The term "caller" is used herein to include the person or entity initiating a communication or call on a calling line associated with a calling line number. In most cases, the caller using a communication to effect the conduct of a transaction with respect to an account is assumed to be the subscriber who subscribes to telecommunications services provided to the calling line used to place the communication. But the caller may be a person or entity other than the subscriber.

Each of the SSPs 22a, 22b is connected to another type of AIN element referred to as a local signal transfer point (STP) 26 via respective data links. Currently, these are data links employing a signaling protocol referred to as Signaling System 7 (SS7). Much of the intelligence of the AIN 21 resides in yet another type of AIN element referred to as a local service control point (SCP) 27 that is connected to the STP 26 over an SS7 data link. Among the functions performed by the SCP 27 is the maintenance of network databases and subscriber databases as represented collectively by databases 30. Moreover, the SCP 27 may communicate so as to deliver and/or obtain information to and/or from other network elements such as a line information database (LIDB) (not illustrated). In addition, the SCP 27 is the repository of service package applications (SPAs) that may be used in connection with or as part of the databases 30 (or other network elements) in the application of telecommunications services or enhanced features to calling lines. An example of such an SPA is the money transfer SPA 31 (M.T. SPA 31) illustrated in SCP 27. As is explained in greater detail below, the M.T. SPA 31 is used in connection with the exemplary embodiment to conduct a transaction with respect to an account based on transaction information provided by a caller in a communication in the PSTN. *An SPA may, for example, include executable instructions stored on a computer-readable medium accessible by, for example, the SCP 27.*

Still referring to FIG. 2, the local STP 26 may be connected to other network elements through a regional STP 32, which in turn, may be connected to a regional SCP 34. Both regional SCP 34 and local SCP 27 are connected via respective data links to a service management system (SMS) 35. The SMS 35 interfaces to business offices of the local exchange carrier (LEC) and interexchange carriers (IXCs).

As illustrated in FIG. 2, the SMS 35 is at least functionally connected to a billing system 37 for billing fees to subscribers for the provision of telecommunications services. In the billing system 37, each subscriber of telecommunications services is assigned to or has at least an account (also referred to as a telecommunications account) with respect to the charging and payment of fees for telecommunications services provided to the subscriber. Typically, a telecommunications account is associated with at least one calling line number that receives a telecommunications service. The billing system also may include other accounts, which are unrelated to the provision of conventional telecommunications services. These other accounts may be set up in the billing system so as to serve initiators of transactions or as subject matter or recipients of transactions that may be initiated by callers pursuant to the exemplary embodiments of the present invention. See, for example, discussion of order transactions below.

Referring again to the SSPs 22a, 22b in FIG. 2, the provisioning of triggers is now discussed. In order to keep the processing of data and calls as simple as possible, a relatively small set of triggers is defined at the SSPs for each call. A trigger in the AIN is an event associated with a particular calling line that generates a packet to be sent to an SCP. The trigger causes the SCP to query a database(s) and/ or SPA(s) for processing instructions with respect to the particular call. The results are sent back to the SSP in a response from the SCP 27 through STP 26. The return packet includes instructions to the SSP as to how to process the call. The instructions may be to take some special action as a result of a customized calling service or enhanced feature. In response, the SSP moves through its call states, collects the dialed digits, and generates further packets that are used to set up, process and/or route the call. Similar devices for routing calls among various local exchange carriers (LECs) are provided by regional STP 32 and regional SCP 34.

With respect to triggers, an exemplary embodiment allows each of the calling lines that may be used for the transaction service at a particular. SSP a special access code trigger. The special access code trigger also may be referred to as a feature access code trigger. Preferably, this trigger is a public office feature code trigger (POFC) that responds to a special access code (also referred to as a feature access code) such as an asterisk followed by two or more digits that may be dialed from a telephone, to-wit: *XX. With respect to the conduct of a transaction, an exemplary special access code may be as follows: *CASH. With respect to the conduct of a transaction that includes the ordering of a widget that has been advertised on television in connection with an advertised "number to dial", an exemplary special access code may be as follows: *WIDGET. Thus, a caller dials the special access code (such as *XX) which triggers the SSP based on the recognition of the special access code as a POFC trigger to initiate a query/response exchange with the SCP 27.

As illustrated in FIG. 2, the AIN 21 also includes an intelligent network element 36 (INE). The INE 36 may be an intelligent peripheral, a service circuit node, a service node, or other network element with the appropriate functionality. Preferably, INE 36 includes voice and dual tone multi-frequency (DTMF) signal recognition devices and voice synthesis devices. In addition, INE 36 may include a money transfer SPA 38 (M.T. SPA) for use in connection with the exemplary embodiment as is described further below. Generally, the M.T. SPA 38 used in the INE 36 is not the same as the M.T. SPA 31 used in the SCP 27, but the M.T. SPAs 31, 38 in the respective elements 27, 36 generally work together to bring about the execution of a transaction as requested by a caller. In particular, the respective M.T. SPA is used by or in connection with the network element with which it is associated so as to provide that aspect of the method or system of the exemplary embodiment that is to be provided in connection with the network element.

INE 36 is connected to the local SCP 27 via a data link 39 using an X.25 protocol and to the SMS 35 via a data link. In addition, INE 36 typically is connected to one or more (but usually only a few) SSPs-via an Integrated Service Digital Network (ISDN) links as shown by the connection to SSP 22b. Further, the AIN 21 may include or have access to more than one INE, although only one INE is illustrated in FIG. 2.

This concludes the overview of AIN elements as they may be used in connection with exemplary embodiments of the present invention. Discussion follows below with respect to the exemplary operation of an exemplary embodiment in this exemplary environment.

Figure 3A:
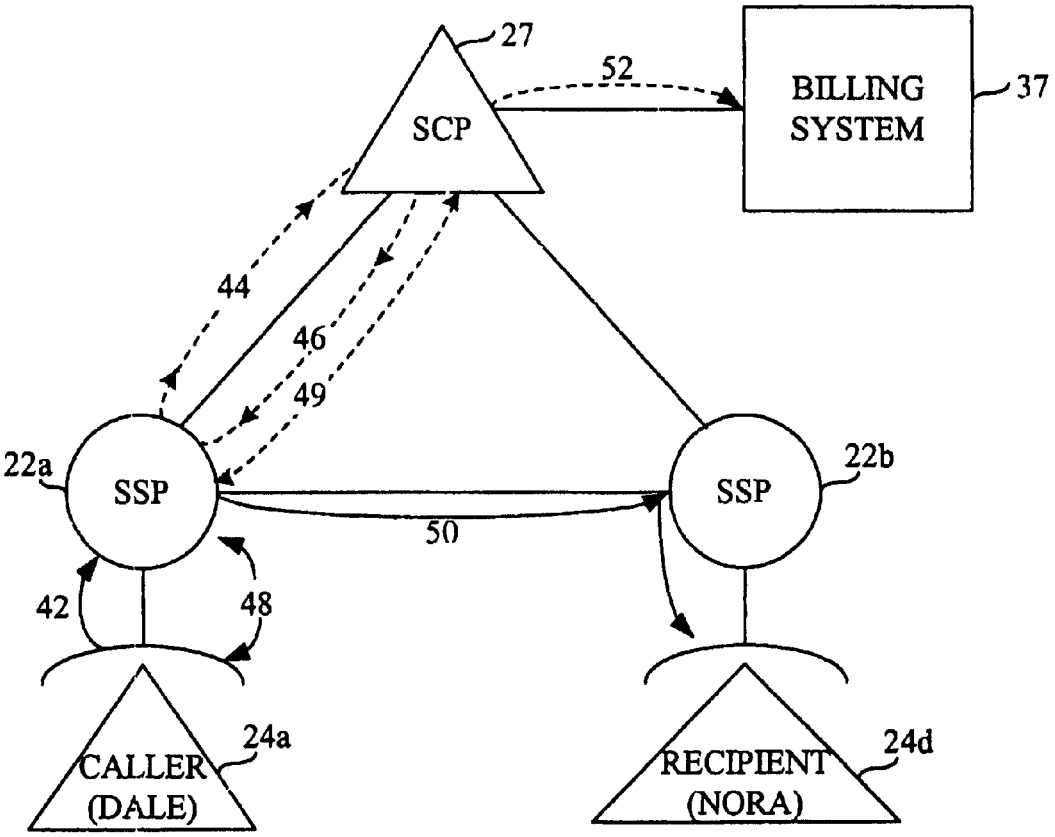
FIGS. 3A–3B are timing/block diagrams illustrating exemplary methods and systems of operation of the present invention.
Figure 3B:
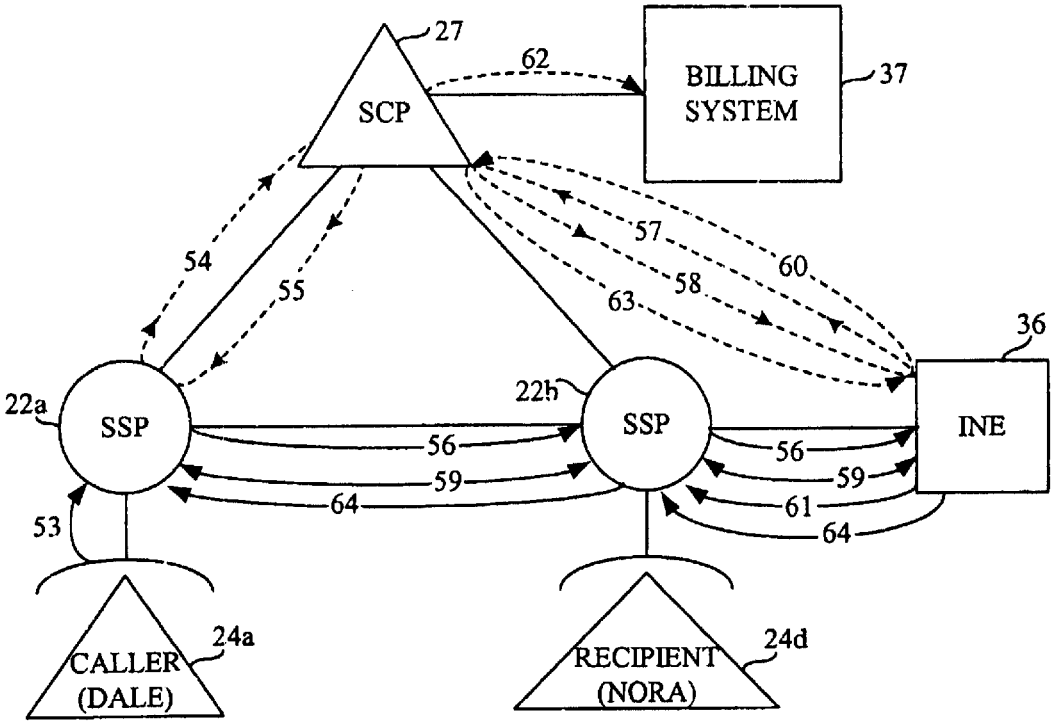

Exemplary Operation of Exemplary Embodiments—FIGS. 3A–3B

FIGS. 3A and 3B are timing/block diagrams illustrating exemplary methods and systems of operation of the present invention. FIG. 3A illustrates an exemplary method and system that are collectively referred to herein as the basic model because they make use of an SSP 22a. FIG. 3B illustrates another exemplary method and system, but that are collectively referred to herein as the complex model because they makes use of an INE 36. The basic model and the complex model are described concurrently below.

The basic model and the complex model are explained in the context of a caller making use of the exemplary embodiments to initiate the execution of a transaction with respect to an account. Assume a caller ("Dale") is using his telephone 24a which is connected to calling line 25a and to SSP 22a. An account ("Dale's account") has been set up in the billing system 37 to charge Dale for the telecommunications services provided to calling line 25a. Dale's account is the calling line number account associated with Dale's calling line 25a. Dale's account may reflect a flat rate charged on a monthly basis for telecommunications services provided to Dale's calling line 25a. Dale's account also may reflect individual or event charges that are charged to Dale's account only upon the occurrence of an event such as the provision of a special service or enhanced feature to Dale's calling line 25a. For example, Dale's account may be charged 50¢ for each instance of call forwarding with respect to Dale's calling line 25a for the implementation of a temporary calling line service applied to Dale's calling line 25a. As another example, Dale's account may be charged $1 for each instance of use of a transaction service.

With respect to the exemplary embodiments, the SSP 22a that serves Dale's calling line 25a is set up such that the SSP 22a initiates a query/response exchange with SCP 27 on receipt of a communication that is dialed or directed to a special access code or preselected number based on a public office feature (POFC) trigger.

Also assume that another person ("Nora") has a telephone 24d which is connected to calling line 25d to SSP 22b.

Another account ("Nora's account") has been set up in the billing system 37 to charge Nora for the telecommunications services provided to calling line 25d. Nora's account is the account associated with Nora's calling line 25d.

Further assume Dale is interested in initiating the execution of a transaction whereby Nora's account is credited with $50 and Dale's account is debited by $50 plus a service fee. As a first action in the execution of the transaction, Dale (caller) places a call from his telephone 24a and calling line 25a by dialing a special access code such as *CASH. Alternatively, Dale may place a call from his telephone 24a and calling line 25a by dialing a preselected number which is associated with a POFC trigger in SSP 22a.

As indicated by arrow 42 in FIG. 3A and by arrow 53 in FIG. 3B, the special access code (or the preselected dialed number) is received with the communication in the SSP 22a serving Dale's calling line 25a. The special access code (or the preselected dialed number) is recognized by the SSP 22a as an indicator of the special status of the communication. The solid line in arrows 42 and 53 and other arrows in the figures indicates the communication is carried over voice links rather than data links. The special access code (or the preselected dialed number) triggers the SSP 22a to pause in the processing of the communication and to obtain further instructions from other network elements.

Referring to the example, Dale's call to *CASH is received in SSP 22a, which pauses in the processing of the communication to request instructions from SCP 27. As indicated in FIG. 3A by arrow 44 and in FIG. 3B by arrow 54, this request preferably takes the form of a query from SSP 22a to SCP 27. The dashed line in arrows 44 and 53 and other arrows in the figures indicates the medium is a data link rather than a voice link and the information exchange is a data exchange.

As part of the SSP's 22a query to the SCP 27 for processing instructions, the SSP 22a provides the SCP 27 with identification information relating to the communication. In particular, the SSP 22a provides the SCP 27 with the special access code (or the preselected dialed number) dialed by the caller and the calling line number associated with Dale's calling line 25a, i.e., Dale's telephone number. The calling line number 25a, i.e., Dale's telephone number. The calling line number may be referred to as the telephone number, and in this example, the SSP 22a provides the SCP 27 with identification information including *CASH and Dale's telephone number. The SSP 22a also may provide the SCP 27 with other information as appropriate to a query/response message exchange.

In response to receiving the identification information from the SSP 22a, the SCP 27 carries out certain functions. The SCP 27 looks up the meaning of the special access code (or the preselected dialed number). This look-up may be accomplished through use of a service package application (SPA) such as the money transfer SPA 31 (M.T. SPA) or through some other source. Upon look-up, the SCP 27 determines the communication is an indication for a special service, such as the desire of the caller to make use of a transaction service. In particular, the caller desires to initiate the execution of a transaction with respect to an account.

Validation by SCP Upon Indication of Caller's Desire for Transaction Service

Once the SCP 27 determines the caller desires to make use of a transaction service, the SCP 27 may use the M.T. SPA 31 to carry out a validation with respect to the execution of the transaction. For example, the SCP 27 may check that an execution of a transaction may be carried out with respect to the account (calling line number account) corresponding to the calling line number associated with the communication. In other words, the SCP 27 may check that a call received on Dale's calling line 25a, associated with Dale's calling line number, and/or associated with Dale's calling line number account may be used to initiate the execution of a transaction. Even more simply stated, the SCP 27 may check that a call originating from Dale's telephone number is to be provided with transaction service. To carry out this check, the SCP 27 may use the M.T. SPA 31 or other table, database, or network element to determine whether the calling line number account is authorized or provisioned with respect to the transaction service, and specifically, with respect to the execution of a transaction. Alternatively, or in addition, a validation with respect to the transaction service, and specifically, with respect to the execution of the transaction may be carried out later in the processing of the communication as is explained below.

If the calling line number account is not authorized or not provisioned with respect to the transaction service, and specifically, the execution of the transaction, or otherwise the communication fails validation, then the execution of the transaction may be discontinued. The SCP 27, and in particular, the M.T. SPA 31, may provide instructions to the SSP 22a with respect to the discontinuance of the execution of the transaction. In turn, the SSP 22a may provide the caller or communication with an announcement with respect to the discontinuance of the execution of the transaction. In addition, the SSP 22a may provide the caller or communication with information or instructions on what must be done or provided to proceed with execution of the transaction, or other information.

Creation of Transaction Identifier by SCP

In response to a determination the communication is an indication the caller desires to make use of a transaction service, the SCP 27 may create a transaction identifier with respect to the transaction.

The SCP 27 may create the transaction identifier to keep track of the transaction so as to properly associate any transaction information the SCP 27 later receives with the appropriate transaction identifier and other information stored in association with the transaction identifier. In addition, the SCP 27 may create the transaction identifier and link it or use it as a key to access stored information relating to the subscriber. The stored information relating to the subscriber may pertain to the manner, if any, in which the subscriber's transaction service may be provisioned. For example, the subscriber's transaction service may be provisioned such that it includes a stored PIN, a stored identification of a number of accounts which may serve as the subject matter of a transaction relating to this subscriber, and/or a stored indication of a dollar amount, number of units, or similar measure which may not be exceeded in a transaction initiated by this subscriber.

Preferably, the transaction identifier may be a ten digit number that may be arbitrary, or may be related to other information relevant to the transaction the caller desires to have executed. As an example, the first four digits of the transaction identifier may be the month and day of the receipt of the information related to the communication, or some other four digit number for the date. The last six digits of the transaction identifier may be related to the caller's telephone number or calling line account number. The SCP 27 may retain the transaction identifier in a database record in a real-time database or some other appropriate storage medium. The creation and/or retention of the transaction identifier may be accomplished through the use of the M.T. SPA 31 of the SCP 27.

Creating and storing this transaction identifier at this point in the call processing is advantageous because the SCP 27 otherwise typically does not have any information with respect to the transaction the caller desires to have conducted with respect to an account. This transaction information generally is provided later to the SCP 27. Creation and storage of the transaction identifier at this point allows for the later received transaction information to be properly associated with the transaction identifier so as to provide for the optional validation of the communication and/or the execution of the transaction through the use of a billing message as is explained below.

This exemplary embodiment may further provide the SCP 27 retain the transaction identifier for a predetermined length of time. After expiration of the predetermined length of time without association of transaction information or other data, events or information with the transaction identifier, then the transaction identifier and/or its associated record in the real-time database or other storage medium may be erased or otherwise deleted.

Response by SCP to Query from SSP

As noted above, upon look-up of the information provided by the SSP 22a in the query, the SCP 27 determines the communication is an indication for a special service, and particularly, that the caller desires to make use of a transaction service. The SCP provides a response to the query that differs between the basic model and the complex model.

Basic Model

Generally, in the basic model, the SCP 27 provides the SSP 22a with instructions as necessary so that the SSP 22a obtains the transaction information from the caller 24a and then transmits the transaction information to the SCP 27 so the transaction may be carried out. Thus, in the basic model as indicated by arrow 46 in FIG. 3A, the SCP 27 provides a response including instructions to the SSP 22a to obtain the transaction information. The response may include the transaction identifier created by the SCP 27.

Complex Model

Generally, in the complex model, the SCP 27 provides the SSP 22a with instructions to route the call to the INE 36 so the INE 36 may obtain the transaction information from the caller and transmit the transaction information to the SCP 27. The AIN 21 may include more than one INE. Thus, the determination of the SCP 27 may include selecting the appropriate INE for routing of the communication. The determination to route the communication to an INE and the selection of an appropriate INE also may be accomplished through the user of an SPA such as the M.T. SPA 31.

In the complex model as indicated by arrow 55 in FIG. 3B, the SCP provides a response including instructions to the SSP 22a to route the communication to the INE 36. These routing instructions may include the directory number of the INE. Depending on the selected INE, the directory number provided to the SSP 22a by the SCP 27 may be a special directory number for that INE 36 in that only communications requesting a transaction service may be routed to the special directory number. As indicated by arrows 56 in FIG. 3B, based on the instructions in the response from the SCP 27, the SSP 22a routes the communication over voice links in a conventional manner through the PSTN to the SSP 22b serving the INE 36 to then to the MNE 36.

Upon receipt of the communication from the SSP 22a, the INE 36 recognizes the communication as a request for special service. The INE 36 may make this recognition on the basis of the caller's use of the special access code (or the preselected dialed number) in placing the communication. Alternatively or in addition, the INE 36 may make this recognition based on the routing of the communication by the SSP 22a to the special directory number of the INE 36. The INE 36 may make the recognition by checking an appropriate table or database or through the use of an SPA such as the money transfer SPA (M.T. SPA) 38 that may be included or accessible to the INE 36.

On the basis of the recognition of the communication as a request for special service, as indicated by arrow 57 in FIG. 3B, the INE 36 pauses in the processing of the communication to query the SCP 27. The INE 36 provides the SCP 27 with identification information relating to the communication such as discussed above in connection with arrows 44 and 54. In addition, if the INE 36 has been provided with a transaction identifier in connection with the communication, then the INE 36 may provide this transaction identifier to the SCP 27.

In response to receiving the identification information from the INE 36, the SCP 27 carries out certain functions. The SCP 27 looks up the meaning of the special access code (or the preselected dialed number), the special directory number of the INE 36, and/or the transaction identifier. This look-up may be accomplished through use of an SPA such as the M.T. SPA 31 or through some other information source. Upon look-up, the SCP 27 determines the communication is an indication the caller desires to make use of a transaction service. In particular, the caller desires to initiate the execution of a transaction with respect to an account.

The SCP 27 provides the INE 36 with instructions to carry out the transaction service. Generally, these call instructions are two-part and direct the INE 36 (1) to obtain transaction information from the communication, and (2) to transmit the transaction information to the SCP 27. Thus, as indicated by arrow 112 in FIG. 6, the SCP 27 provides a response to the query of the INE 36 wherein the response includes the call instructions to the INE 36.

Obtaining Transaction Information

The transaction information pertains to the transaction the caller desires to be executed with respect to an account. Transaction information may include any type of information relevant to the transaction to be conducted. Transaction information may include as elements: calling line numbers; account numbers; numbers of units; dollar amounts involved in the transaction; dates and/or times for the transaction; identities of parties that may be involved in the transaction; and/or messages associated with the transaction, etc.

Base Model

In the base model, the SSP 22a obtains the transaction information from the caller 24a. Given the limitations of an SSP, the SCP 27 may provide a first set of instructions to the SSP 22a to obtain a first bit of transaction information from the communication. Based on the call instructions from the SCP 27, as indicated by arrow 48 in FIG. 3A, the SSP 22a obtains at least the first bit of transaction information from the caller and/or communication. The double head on arrow 48 indicates an information exchange takes place between the communication and/or caller using telephone 24a and the SSP 22a. After obtaining the first bit of transaction information, the SSP 22a may provide the first bit of transaction information to the SCP 27 and make inquiry of the SCP 27 for further instructions. As indicated by double-headed arrow 49 in FIG. 3A, the rounds of instructions/request for further instructions may continue as necessary to obtain the transaction information and to provide it to the SCP 27.

To carry out the information exchange, the SSP 22a may use its existing functionality. For example, the SSP 22a may engage in an audio or dual tone multi-frequency (DTMF) interaction. The SSP 22a (or its appropriate functionality) may make the inquiry and take the transaction information in a menu-driven format.

Complex Model

In the complex model, the INE 36 obtains the transaction information from the caller 24a. Based on the call instructions from the SCP 27, as indicated by arrows 59 in FIG. 3B, the INE 36 obtains the transaction information from the caller and/or communication. The double head on arrows 59 indicates an information exchange takes place between the communication and/or caller using telephone 24a and the INE 36. The INE 36 may use the M.T. SPA 38 to obtain the transaction information. The M.T. SPA 38 also may collect, compile, and format the information from the caller. As indicate by arrow 60 in FIG. 3B, the transaction information is provided by the INE 36 to the SCP 27, and preferably to the M.T. SPA 31. As appropriate, the INE 36 (or applicable functionality) may convert the transaction information from the format in which it is received from the caller and/or communication to the format most appropriate for transmission to and use by the SCP 27, and preferably, the M.T. SPA 31.

Example of Obtaining Transaction Information

Referring to our example, in the basic model the SSP 22a and in the complex model the INE 36 obtains information from Dale with respect to the transaction to be conducted that credits Nora's account with $50 and debits Dale's account by $50 plus a service fee. Nora's calling line number (also referred to as Nora's telephone number) is obtained, as well as an indication Dale desires that Nora's account associated with her telephone number be credited, and an indication the amount by which to credit Nora's account is $50.

Optional Routing of Communication to Recipient's Telephone Number

An exemplary embodiment of the present invention includes an optional routing of the communication from the caller to the recipient's telephone number. For example, the caller may desire to inform the recipient of the transaction, and this optional routing of the communication may efficiently provide a mechanism therefor. Once the transaction information has been obtained from the communication and provided to the SCP, then the communication may be routed to the recipient (or other party designated by the caller). Alternatively, the routing of the communication to the recipient may be delayed until confirmation is received that the transaction will be carried out. In the basic model, as indicated by arrow 50 in FIG. 3A, the SSP 22a routes the communication pursuant to the transaction information, and particularly, pursuant to the calling line number of the recipient or as provided by the caller. In the complex model, as indicated by arrow 61 in FIG. 3B, the INE 36 routes the communication in a similar fashion.

Validation by SCP Upon Receipt of Transaction Information

Upon receipt of the transaction information, the SCP 27 is provided with the transaction identifier (in the transaction information and/or in the identification information related to the communication). The SC 27 uses the transaction identifier so as to retrieve the appropriate record, data, event or other information from a database or other storage medium and that relates to the transaction or the use of the transaction service.

In particular, with the receipt of the transaction information, the SCP 27 may carry out a validation with respect to the transaction. The careful reader will note a validation by the SCP 27 may have taken place earlier in the transaction process as described above in connection with arrow 44 of FIG. 3A or arrow 54 of FIG. 3B. The earlier validation may have taken place in response to an indication of the caller's desire for transaction service. The same type of validation may be carried out again, possibly as a double-check. Alternatively, no validation may be carried out at this point in the call processing, and the execution of the transaction may be continued as discussed below in connection with the basic model as indicated by arrow 52 of FIG. 3A or the complex model as indicated by arrow 62 of FIG. 3B. Yet another alternative may be that one or more other types of validation may be carried out at this point by the SCP 27 in addition to the earlier validation or in the alternative to the earlier validation.

Types of Validations

Another type of validation that may be conducted in the alternative or in addition to the validation discussed in the preceding paragraph, the SCP 27 may carry out a validation with respect to a personal identification number (PIN). For example, the SCP 27 may be provided with transaction information that includes a PIN obtained from the caller and/or the communication. The SCP 27 may use the M.T. SPA 31 (or other table, database, or network element) to determine whether the PIN corresponds to a stored PIN associated with the calling line number or calling line number account.

As yet another type of validation that may be conducted in the alternative or in addition, the SCP 27 may carry out a validation with respect to the account the caller has specified as the subject matter of the transaction. In particular, the account associated with the calling line number (calling line number account), i.e., the caller's account, may be set up so as to be authorized to initiate the execution of a transaction only with respect to one or more other accounts. The SCP 27 may use the M.T. SPA 31 (or other table, database, or network element) to determine whether the account number provided in the transaction information corresponds to a stored account number associated with the calling line number or caller's account. If there is correspondence between the account number in the transaction information and the stored account number, then the communication may be considered to be validated, at least with respect to this type of validation.

A further type of validation that may be conducted in the alternative or in addition, the SCP 27 may carry out a validation with respect to the dollar amount, number of units, or similar measure the caller has specified as the subject matter of the transaction. In particular, the account associated with the calling line number (calling line number account), i.e., the caller's account, may be set up so as to be authorized to initiate the execution of a transaction only with respect to or up to a limited dollar amount, number of units, or similar measure. The SCP 27 may use the M.T. SPA 31 (or other table, database, or network element) to determine whether the dollar amount, number of units, or similar measure provided in the transaction information by the SSP 22a corresponds to or falls within a stored dollar amount, number of units, or similar measure associated with the calling line number or caller's account. If there is correspondence between or the dollar amount, number of units, or similar measure in the transaction information falls within the stored dollar amount, number of units, or similar measure then the communication may be considered to be validated, at least with respect to this type of validation.

Provisioning of Transaction Service for the Validation(s)

Depending on the type and number of validations that are carried out with respect to a subscriber's transaction service, the transaction service may require that certain information be stored or provisioned during set up of the transaction service for the subscriber. This certain information may be referred to as validation information. Depending on the type of validation, the caller or subscriber may have provided or been provided with validation information such as: (1) a PIN to be used as the stored PIN for validation; (2) one or more account numbers that are designated as the stored account number(s); and/or (3) a dollar amount, number of units, or similar measure. Thereafter, when the caller desires to initiate the execution of a transaction, the caller provides the validation information during the information exchange related to the transaction service. If the validation information provided in the transaction information corresponds to the stored validation information, then the communication may be considered to be validated. The execution of the transaction may be continued as discussed below in connection with the basic model as indicated by arrow 52 of FIG. 3A or the complex model as indicated by arrow 62 of FIG. 3B. Alternatively, another type(s) of validation may be carried out.

Example of Provisioning of Transaction Service for Validation

Referring to our example, assume the caller, Dale, provides validation information that includes a PIN and that Dale is authorized to initiate the execution of a transaction only with respect to three other accounts, including Nora's account, and only up to a dollar amount of $50. Dale provides Nora's account number and a dollar amount of $50. The SCP 27 may use the M.T. SPA 31 (or other table, database, or network element) to determine whether the PIN corresponds to the stored PIN associated with Dale's calling line number, whether Nora's account number corresponds to one of the three stored account numbers associated with Dale's calling line number, and whether the provided dollar amount corresponds to or falls within the stored dollar amount. If correspondence is lacking between any pair of the relevant elements, then the communication fails validation. If correspondence is found between the relevant elements, then the communication is validated.

Failing Validation

If a communication fails validation, for whatever reason, then the execution of the transaction is discontinued. The SCP 27, and in particular, the M.T. SPA 31, may provide instructions with respect to the discontinuance of the execution of the transaction. In turn, the caller or communication may be provided with an announcement of the discontinuance of the execution of the transaction. In addition, the caller or communication may be provided with information or instructions on what must be done or provided to proceed with execution of the transaction, or other information.

Advantages of Validation

Validation of a communication is optional, but also is preferable. The preference for validation is that such measures may serve to deter or limit the abuse of the transaction service by unauthorized and/or unscrupulous parties. For example, an unscrupulous third party may attempt to use a telephone on Dale's calling line 25a to conduct a transaction that credits the third party's account and debits Dale's account. Validation inhibits the execution of the transaction if the third party were unable to provide the correct validation information such as the PIN, if the third party's account number is not listed as a stored account number with respect to the transaction service as provisioned for the subscriber, and/or if the dollar amount, number of units, or similar measure provided by the third party did not correspond to or fall within the stored dollar amount, number of units, or similar measure with respect to the transaction service as set up for the subscriber or caller on the calling line number.

Execution of the Transaction

After the SCP 27 carries out the validation (or if validation is not used, after the transaction information is provided to the SCP 27), then on the basis of the transaction information, the SCP 27, and preferably M.T. SPA 31 takes action with respect to the execution of the transaction. As noted in the background, prior to this invention, there was no manner by which a caller could use a communication to execute a transaction with respect to an account as provided herein. Advantageously, an exemplary embodiment of the present invention uses a billing message to pass additional information, and in particular, the transaction information from the caller and/or communication to the billing system so as to initiate the execution of the desired transaction.

Posting a Billing Message Including Transaction Information

Advantageously, pursuant to exemplary embodiments of the present invention, the SCP 27 posts a billing message so as to include transaction information in the fields of a billing message.

An example of a billing message that may be used with exemplary embodiments is a Structure Code 223, Automatic Message Accounting (AMA) billing record. Generally, a Structure Code 223, AMA billing record is used for aggregating large volumes of queries or service usage against an account of a subscriber. Additional information about the Structure Code 223, AMA billing record may be obtained from BellCore Automatic Message Accounting Format, G.R. 1100 Issue 3 (December 1998), which is incorporated herein by reference.

Particularly, a Structure Code 223, AMA billing record such as may be used with exemplary embodiments of the present invention includes the following fields:

Call Type Code (AIN SCP Aggregate Record—Intranetwork)

Sensor Type=a 3-digit numeric value to indicate that an AIN SCP is generating the record (recent-changeable & administrable via manual)

Recording Office Identification

Date of Aggregation Period

Study Indicator

Aggregate Period Start Time

Aggregate Period Elapsed Time

Aggregation period Information

Service Logic identification

Originating NPA-NXX

Query Originator

Data Owner

Service Type

ICN ID

Type of Count

Count

In an exemplary embodiment, the present invention re-uses certain of the above-listed fields for holding elements of the transaction information. For example, the field of the Aggregate Period Elapsed Time may hold the transaction identifier; the field of Aggregation Period Information may hold the account number of the recipient; and the field of Service Logic Identification may hold an identification of the type of transaction to be conducted. Types of transaction are discussed below. In addition, the field of ICN ID may hold the special access code or preselected dialed number (such as *CASH). The field of Type of Count may hold a flag indicating whether the transaction is a credit transaction or a debit transaction. The field of Count may include the number of units involved in the transaction. Other elements of transaction information may be held in the other fields of the billing message, and/or combined with elements of the transaction information in the previously specified fields of the billing message. The correspondence assigned between a field of a billing message and the element of the transaction information to be held by that field is irrelevant so long as the assignment is recognized for proper inclusion and retrieval of the transaction information.

Retrieval of the Billing Message

After the posting of the transaction information in the fields of a billing message to the billing subsystem on the SCP 27, as indicated by arrow 52 in FIG. 3A and by arrow 62 in FIG. 3B, the transaction information is provided to (or obtained by) the billing system 37. Pursuant to the exemplary embodiment, the billing messages generally are stored as files on the billing subsystem on the SCP 27 for periodic retrieval by an Electronic Toll Collection System (ETCS) (not shown). The ETCS retrieves the billing messages on a daily basis via an X.25 FTAM interface provided by the SCP 27. The ETCS transmits the billing messages to the billing system 37. An exemplary billing system 37 is the Customer Records and Information System (CRIS).

Upon receipt of the billing messages, the billing system 37 is provisioned to recognize transaction information included in a billing message. In response to this recognition, the billing system 37 is provisioned to carry out a transaction(s) with respect to the transaction information. Referring to our example, the billing message received and recognized by the billing system 37 includes Dale's calling line number, a time stamp, a flag indicating a credit transaction is to be carried out, Nora's account number, $50, and an indicator corresponding to the message "Happy Birthday".

In the alternative to the inclusion of a flag or other indicator in the billing message, the exemplary billing system 37 may be provisioned to recognize that the inclusion of an account number in a particular field of the billing message is transaction information, and in particular, the account number corresponds to an account which is the subject of a desired transaction. Further, the billing system 37 may be provisioned to recognize the inclusion of the $50 in a field of the billing message is transaction information, and in particular, the amount of dollars that is to be credited to the account associated with the account number in the transaction. In addition, the billing system 37 may be provisioned to recognize the account associated with the calling line number is to be debited by the $50, and in this example, by an additional dollar amount representing a service fee for the transaction. A possible alternative to charging a service fee per transaction is to provision the billing system to charge the account associated with the calling line number (calling line number account) with a monthly fee for provision of the transaction service to that calling line.

Based on the recognition of the transaction and the transaction information in the billing message, the billing system (or the billing system through an M.T. SPA) may carry out the transaction. For example, the billing system may effectively "pay Nora's account" by crediting Nora's account by $50. The billing system "pays for the credit" by debiting Dale's account by $50 plus any service fee.

Confirming the Execution of the Transaction (Optional)

Once the SCP 27 posts the transaction information as a billing message to the billing subsystem on the SCP 27, an exemplary embodiment provides the caller with confirmation of the transaction. In the basic model, the SCP 27 may instruct the SSP 22a to provide the caller 24a with an announcement that confirms the execution of the transaction. In the complex model, as indicated by arrow 63 in FIG. 3B, the SCP 27 may provide the INE 36 with confirmation as to the receipt and posting of the transaction information. In turn, as indicated by arrows 64, the INE 36, and in particular, the M.T. SPA 38 may provide the communication and/or caller 24a with the confirmation. The confirmation may take the form of an announcement. Alternatively, the caller 24a may receive a confirmatory announcement from either the SSP 22a (basic model) or the INE 36 (complex model) at another point in the processing of the transaction.

Exemplary Types of Transactions

Advantageously, the exemplary transaction including Dale's desire to credit Nora's account by $50 is but one type of transaction the billing system 37 may be provisioned to recognize and carry but. As noted, the billing system 37 may be provisioned to recognize and carry out a transaction on the basis of transaction information contained in a billing message such as an AMA record. The billing system 37 also may be provisioned to recognize and carry out additional and/or other types of transactions based on varying types and contents of transaction information contained in a billing message such as a conventional AMA record. For example, a billing message may include transaction information in a field or a flag such that the information or the set flag identifies a particular type of transaction(s). The billing system may recognize the information or the set flag, look up the particular type of transaction identified by the information or the set flag, and carry out the particular transaction based on instructions and/or information stored in the billing system 37 with respect to that particular type of transaction.

An example of another type of transaction that may be carried out by the billing system based on transaction information in a billing message is referred to herein as an order transaction. Advantageously, a caller may use a communication to conduct an order transaction such as ordering goods and/or services from a vendor. The caller and/or communication that is directed to the special access code (or a preselected dialed number) may provide transaction information that includes an account number ("order account number") that corresponds to a product or service offered by a vendor. The transaction information also includes the number of units (or dollar amount) of the product or service that is desired by the caller and/or communication. The billing system is provisioned to recognize the order account number in the billing message as an order for the product and/or service. The billing system is further provisioned to recognize the number of units (or dollar amount) in the billing message as the number of or amount of product and/or service that is desired by the caller and/or communication. Based on this recognition, the billing system (or the billing system through an M.T. SPA) may carry out the order transaction. For example, the billing system may effectively "place the order" by crediting the order account number by the number of units (or dollar amount). The billing system may "pay for the order" by debiting the account corresponding to the calling line number (calling line number account) in the billing message by the number of units (or dollar amount) plus a service fee.

For a more particular example of an order transaction, assume a caller desires to order three sets of steak knives from a vendor. The caller receives information the order may be placed through the transaction service of an exemplary embodiment of the present invention. The caller initiates a communication directed to the special access code and provides transaction information including an account number corresponding to an order of a set of steak knives and including three as the number of units ordered. The billing system recognizes the inclusion of the account number as corresponding to an order for a set of steak knives. The billing system effectively places the order by crediting an account (steak knife account) that has been set up in the billing system for the ordering of steak knife sets.

In this example, the steak knife account does not necessarily correspond to a calling line receiving telecommunications services. In other words, the steak knife account may be set up in the billing system exclusively for the use of ordering steak knife sets by crediting the steak knife account by the number of sets desired. The billing system may provide the steak knife account with other information such as the shipping address of the caller. In response to this credit, the steak knife vendor ships three sets of steak knives to the caller. The billing system effectively pays for the order by crediting the steak knife account for the cost of the three sets of steak knives plus shipping and handling costs. The billing system then pays itself so to speak by debiting the account corresponding to the calling line number (calling line account number) in the billing message by the costs, and possibly a service fee for each of the three sets of steak knives. The caller eventually receives his/her three sets of steak knives as well as an invoice generated by the billing system that includes the charges for the steak knives plus the shipping, handling, and service fee.

Other types of transactions may be implemented through use of the exemplary embodiments. For example, a voting transaction may be implemented. Subscribers may be solicited to vote for a product or service from among a group of products or services. To vote, a subscriber may dial *VOTE, and provide a vote and possibly other information as transaction information which is included in the fields of a billing message. The accumulated transaction information is interpreted to count the votes. The subscriber may be provided with an acknowledgment of his or her vote by a notation or other indication on an invoice or other message the subscriber receives from the service provider of the vote service.

Another example is a registration transaction. The purchaser of a particular product may be requested to register ownership by dialing *REG. The subscriber provides product information as transaction information which is included in the fields of a billing message. The transaction information is interpreted to register the subscriber's purchase of the product. The purchaser may be provided with an acknowledgment of his or her registration of the product by a message transmitted by the registration service provider.

Yet another example is a voucher transaction. A subscriber may desire to present a friend with a voucher as a gift to be used for specified services. The subscriber may dial *GIFT and be provided with a list of products or services available for the voucher transaction. For example, the list may include a gift certificate for use at a particular chain of department stores, a pass for use at a certain movie theater, a coupon for dollars off at a restaurant, or the like. The subscriber may include in the transaction information the subscriber's choice of a product or service, the dollar amount of the voucher, etc. The cost of the voucher is debited against the subscriber's account. The voucher is provided to the recipient in an invoice, letter, or other message delivered to the recipient by the transaction service provider. The voucher may be redeemed by the recipient.

Displaying the Transaction(s) on an Invoice—FIGS. 4A–4B

FIGS. 4A and 4B illustrate exemplary invoices such as may be received by the recipient and caller with respect to a transaction executed pursuant to the transaction service. Generally, a telecommunications service provider sends a monthly invoice for telecommunications services rendered. Exemplary embodiments of the present invention add information about transactions conducted using the transaction service to the appropriate invoices of the recipient and the caller.

FIG. 4A illustrates an invoice 80 such as Nora may receive with respect to the telecommunications service she received from a service provider that provided the transaction service to Dale. The invoice 80 includes a monthly charge 82 of $30 for the telecommunications service provided to Nora's calling line number. The invoice 80 also includes information 84 about a transaction wherein Nora's account was credited by $50. This information 84 includes the "Happy Birthday" message, an indication as to the source of the credit ("from Dale"), and the amount of the credit, to-wit: $50. By this information 84, Nora receives the happy news her account has been credited by $50. The invoice 80 also includes a past due reminder 86 that indicates that $20 is past due. Finally, the invoice 80 includes an amount now due 88 of $50. By crediting Nora's account by $50, Dale has paid off Nora's telephone bill for the month and has paid her past due to the telecommunications service provider.

Advantageously, this pay-off of Nora's telephone bill was easy and efficient for all parties concerned. Dale simply called a special access code, provided the relevant information, and hung up. He had given Nora a birthday present without having to make a trip to the store, write a check, mail a package, or engage in any other time consuming activity. Nora is happy to have her telephone bill and her past due paid off. Nora also is happy to receive a birthday present, and especially the notice that Dale remembered her birthday and thought enough to include a "Happy Birthday" greeting on her telephone bill. The telecommunications service provider is pleased with the transaction because the service provider has a "promise" from Dale to effectively pay-off Nora's monthly telephone charges and past due. Plus, the service provider collects a service fee for the transaction.

FIG. 4B illustrates an invoice 90 such as Dale may receive with respect to the telecommunications services he received from the service provider that provided the transaction service. The invoice 90 includes a monthly charge 92 of $30 for the telecommunications service provided to Dale's calling line number. The invoice 90 also includes information 94 about a transaction service activity. In particular, the information 94 provides information that Nora's account has been credited by $50, that a "Happy Birthday" message was sent to Nora, and that a service fee of $1 has been charged to Dale's account for this transaction. The invoice 90 further includes information 96 about another transaction service activity. In addition to sending Nora a birthday gift of a $50 credit, Dale has been busy ordering a set of steak knives. Information 96 provides information that Dale has ordered one set of steak knives for $30 and that a service fee of $1 has been charged to Dale's account for the transaction. Finally, the invoice 90 includes an amount now due 98 of $112. By crediting Nora's account by $50 and by ordering a set of steak knives, Dale's telephone bill has risen by $82 including service fees for the transaction activities. Advantageously, Dale has saved time and energy by using the transaction service and his "purchases" of the credit to Nora's account and the order of steak knives may be paid off by a single payment to the telecommunications service provider based on this invoice 90.

CONCLUSION

The foregoing detailed description illustrates that exemplary embodiments of the present invention provide methods and systems for using a communication to conduct a transaction with respect to an account. By these embodiments, a caller may effectively "charge" a transaction to his or her telephone number. Further, the caller may use a communication to provide information with respect to a transaction and have the transaction carried out based on the information provided. Advantageously, the caller may have the account of another person credited with a dollar amount and may effectively pay for that credit through a debiting of the caller's account.

From the foregoing description of the exemplary embodiments of the present invention and operation thereof, other embodiments will suggest themselves to those skilled in the art. Therefore, the scope of the present invention is to be limited only by the claims below and equivalents thereof.

I claim:

1. In a telecommunications system functionally interconnecting a service switching point, a service control point, and an intelligent network element, and the telecommunications system including a billing system functionally connected at least to the service control point for retrieval of billing messages, the billing system including telecommunications accounts for charging fees to subscribers with respect to telecommunications services provided to the subscribers, a method for using a communication to conduct a transaction with respect to a telecommunications account, comprising:

receiving the communication at the service switching point, the communication being associated with a calling line number associated with a first telecommunications account;

causing the service switching point to route the communication to the intelligent network element;

causing the intelligent network element to obtain a telecommunications account number and a transaction amount from the communication, the telecommunications account number corresponding to a second telecommunications account with respect to which the transaction is conducted in the billing system;

in response to obtaining the telecommunications account number and the transaction amount, causing the intelligent network element to provide the telecommunications account number, the transaction amount, and a calling line number associated with the second telecommunications account and the communication to the service control point;

in response to receipt of the telecommunications account number, the transaction amount, and the calling line number associated with the second telecommunications account, causing the service control point to make an assignment of the telecommunications account number, the transaction amount, and the calling line number associated with the second telecommunications account to a billing message for billing telephone service usage with respect to the calling line number by reusing a plurality of fields in the billing message to hold at least the telecommunications account number, the transaction amount, and the calling line number; and causing the billing system to retrieve the billing message from the service control point, to note the assignment of the telecommunications account number, the transaction amount, and the calling line number associated with the second telecommunications account, and based on the assignment, to conduct the transaction in the billing system with respect to the second telecommunications account associated with the telecommunications account number by crediting or debiting the telecommunications account by at least the transaction amount, wherein the plurality of fields in the billing message are designed for holding information for billing telephone service usage, and wherein the telecommunications system reuses the plurality of fields to hold transaction information that is not pertinent for billing telephone service usage.

2. The method of claim 1, wherein the transaction amount comprises a number of units or a dollar amount; and wherein the billing system conducts the transaction by crediting or debiting the telecommunications account by at least the number of units or by at least the dollar amount.

3. The method of claim 1, wherein the telecommunications account number comprises a different account number from a calling line number account corresponding to the calling line number associated with the communication received at the service switching point; and wherein the billing system conducts the transaction in the billing system by crediting or debiting the calling line number account by at least the transaction amount.

4. The method of claim 1, wherein prior to causing the service control point to make the assignment of the telecommunications account number, the transaction amount, and the calling line number, the method further comprising causing the service control point to carry out a validation whose result comprises a determination that the calling line number is authorized with respect to conduct of the transaction.

5. The method of claim 4, wherein the intelligent network element obtains a personal identification number (PIN) from the communication, and wherein the validation comprises comparing the PIN for correspondence to a stored PIN associated with the calling line number.

6. The method of claim 4, wherein the validation comprises comparing the telecommunication account number for correspondence to a stored telecommunications account number associated with the calling line number.

7. The method of claim 1, further comprising:

causing the service control point to provide a confirmation regarding the conduct of the transaction to the intelligent network element; and in response to receipt of the confirmation, causing the intelligent network element to provide an announcement to the communication.

8. A method for executing a transaction with respect to an account, comprising:

receiving a communication on a calling line associated with a calling line number;

obtaining an account number and a transaction amount from the communication, the account number corresponding to an account with respect to which a transaction is to be conducted, the account associated with a recipient other than a subscriber associated with a calling line number account associated with the calling line number;

creating a billing message for billing telephone service usage with respect to the calling line number;

reusing a plurality of fields in the billing message to hold elements of transaction information, the transaction information including the account number, the transaction amount, and the calling line number; and using the account number and the transaction amount from the billing message to execute the transaction with respect to the account corresponding to the account number, wherein the plurality of fields in the billing message are designed for holding information for billing telephone service usage, and wherein the plurality of fields are reused to hold transaction information that is not pertinent for billing telephone service usage.

9. The method of claim 8, wherein the communication is directed to a special access code.

10. The method of claim 8, wherein the transaction amount comprises a number of units or a dollar amount; and wherein the account number, and the number of units or the dollar amount, are used to execute the transaction by crediting the account by at least one number of units or by at least the dollar amount and by debiting the calling line number account by at least the number of units or by at least the dollar amount.

11. The method of claim 8, further comprising:

charging the calling line number account associated with the calling line number a fee for the transaction.

12. The method of claim 8, further comprising:

providing the communication with an announcement regarding the transaction.

13. The method of claim 8, wherein prior to obtaining the account number and the transaction amount from the communication, the method further comprises making a validation whose result comprises a determination that the calling line number is authorized with respect to conduct of the transaction.

14. The method of claim 13, wherein the validation comprises obtaining a personal identification number (PIN) from the communication, and checking that the PIN corresponds to a stored PIN associated with the calling line number.

15. The method of claim 13, wherein the validation comprises comparing the account number for correspondence to a stored / number associated with the calling line number.

16. In a system for billing fees to subscribers for provision of telecommunication services, each subscriber having a telecommunications account in the system, the telecommunications account being associated with at least one calling line number, a method to conduct a transaction with respect to a telecommunications account in the system, comprising:

obtaining a billing message generated as a result of a telecommunications service performed with respect to a calling line number, wherein at least one field of the billing messages for billing telephone service usage with respect to the calling line number are reused to hold transaction information;

in response to obtaining of the billing message, making a determination that the billing message includes an indication that a transaction is conducted with respect to a telecommunications account in the system, the telecommunications account associated with a recipient other than the subscriber associated with a calling line number account associated with the calling line number; and in response to the determination, conducting the transaction with respect to the telecommunications account, wherein the plurality of fields in the billing message are designed for holding information for billing telephone service usage, and wherein the plurality of fields are reused in the obtaining step to hold transaction information that is not pertinent for billing telephone service usage.

17. The method of claim 16, wherein conducting the transaction with respect to the telecommunications account comprises crediting the telecommunications account by at least a number of units or a dollar amount, and/or debiting a different telecommunications account by at least the number of units and/or by at least the dollar amount, the different telecommunications account being associated with the calling line number receiving the telecommunications service that generated the billing message.

18. The method of claim 16, wherein the indication comprises the transaction information; and wherein conducting the transaction comprises using the transaction information with respect to the telecommunications account.

19. The method of claim 18, wherein the transaction information comprises a number of units and/or a dollar amount; and wherein conducting the transaction comprises using the number of units and/or the dollar amount with respect to the telecommunications account.

20. The method of claim 16, further comprising:

generating an invoice for the telecommunications account, the invoice indicating conduct of the transaction with respect to the telecommunications account.

21. The method of claim 20, wherein the invoice further indicates a message relating to the transaction conducted with respect to the telecommunications account.

22. The method of claim 20, further comprising:

generating a different invoice for the different telecommunications account, the different invoice indicating the conduct of the transaction with respect to the telecommunications account.

23. The method of claim 22, wherein the different invoice further indicates a different message relating to the transaction conducted with respect to the telecommunications account.

24. In a telecommunications system wherein a billing message is created with respect to a communication, wherein the billing message is further created with respect to a calling line number account corresponding to a calling line number associated with the communication, and wherein the billing message is obtained by a billing system having access to the calling line number account and to other accounts, a method for execution of a transaction in the billing system between the calling line number account and one of the other accounts to which the billing system has access comprising:

providing that the billing message includes an indication for the execution of the transaction, wherein the indication is contained in at least one field of the billing message that is reused to contain transaction information;

causing the billing system to make a recognition of the indication in the billing message; and in response to an indication in the billing message, causing the billing system to execute the transaction between the calling line number account associated with a subscriber and the one of the other accounts associated with a recipient other than the subscriber, wherein the at least one field of the billing message is designed for holding information for billing telephone service usage, and wherein the at least one field is reused in the providing step to hold transaction information that is not pertinent for billing telephone service usage.

25. The method of claim 24, wherein causing the billing system to execute the transaction comprises crediting the one of the other accounts by at least a number of units or a dollar amount, and/or debiting the calling line number account by at least the number of units and/or by at least the dollar amount.

26. The method of claim 25, wherein causing the billing system to execute the transaction comprises debiting the calling line number account by a service fee for the transaction.

27. The method of claim 24, wherein the billing system executes the transaction between the calling line number account and the one of the other accounts by using the transaction information.

28. The method of claim 24, further comprising:

causing the billing system to generate an invoice for the one of the other accounts, the invoice indicating execution of the transaction with respect to the one of the other accounts.

29. The method of claim 28, wherein the invoice further indicates a message relating to the transaction conducted with respect to the one of the other accounts.

30. The method of claim 28, further comprising:

generating a different invoice for the calling line number account, the different invoice indicating the execution of the transaction with respect to the one of the other accounts.

31. The method of claim 30, wherein the different invoice further indicates a different message relating to the transaction conducted with respect to the oen of the other accounts.

32. The system of claim 1, wherein the billing message is a Structure Code 223, Automatic Messaging Accounting (AMA) billing record.

33. The method of claim 8, wherein the billing message is a Structure Code 223, Automatic Messaging Accounting (AMA) billing record.

34. The system of claim 16, wherein the billing message is a Structure Code 223, Automatic Messaging Accounting (AMA) billing record.

35. The system of claim 16, wherein the transaction is a voting transaction.

36. The system of claim 16, wherein the transaction is a registration transaction.

37. The system of claim 16, wherein the transaction is a voucher transaction.

38. The system of claim 24, wherein the billing message is a Structure Code 223, Automatic Messaging Accounting (AMA) billing record.

39. The system of claim 24, wherein the transaction is a voting transaction.

40. The system of claim 24, wherein the transaction is a registration transaction.

41. The system of claim 24, wherein the transaction is a voucher transaction.

42. In a telecommunications system functionally interconnecting a service switching point, a service control point, and an intelligent network element, and the telecommunications system including a billing system functionally connected at least to the service control point for retrieval of billing messages, the billing system including accounts for conducting transactions, a method for using a communication to conduct a transaction with respect to an account, comprising:

receiving the communication at the service switching point, the communication being associated with a calling line number;

causing the service switching point to obtain instructions regarding the account from a service control point;

based on the instructions from the service control point, causing the service switching point to obtain an account number and a transaction amount from the communication, the account number corresponding to an account with respect to which the transaction is to be conducted in the billing system, the account associated with a recipient other than a subscriber associated with a calling line number account associated with the calling line number;

in response to obtaining the account number and the transaction amount, causing the service switching point to provide the account number, the transaction amount, and the calling line number associated with the communication to the service control point;

in response to receipt of the account number, the transaction amount, and the calling line number, causing the service control point to make an assignment of the account number, the transaction amount, and the calling line number to a billing message for billing telephone service usage with respect to the calling line number by reusing a plurality of fields in the billing message to hold elements of transaction information, the transaction information including the account number, the transaction amount, and the calling line number in the billing message and by posting the billing message for obtaining the billing system; and causing the billing system to retrieve the billing message from the service control point, to note the assignment of the account number, the transaction amount, and the calling line number to the billing message, and based on the assignment, to conduct the transaction in the billing system with respect to the account associated with the account number by crediting or debiting the account by at least the transaction amount, wherein the plurality of fields in the billing message are designed for holding information for billing telephone service usage, and wherein the plurality of fields are reused in the causing step to hold transaction information that is not pertinent for billing telephone service usage.

43. The system of claim 42, wherein the billing message is a Structure Code 223, Automatic Messaging Accounting (AMA) billing record.

44. A method for executing a transaction, comprising:

receiving [the] *a* communication associated with a calling line number;

obtaining a transaction amount from the communication;

coding the transaction amount and the calling line number into a billing message for billing telephone service usage with respect to the calling line number by reusing at least one field of the billing message to hold transaction information;

posting the billing message;

obtaining the billing message, and decoding the transaction amount and the calling line number from the billing message; and crediting or debiting an account by the transaction amount, the account associated with a recipient other than a subscriber associated with the calling line number, wherein the at least one field of the billing message is designed for holding information for billing telephone service usage, and wherein the at least one field is reused in the coding step to hold transaction information that is not pertinent for billing telephone service usage.

45. The method of claim 44, wherein the billing message is a Structure Code 223, Automatic Messaging Accounting (AMA) billing record.

46. A system for allowing a user to initiate a transaction and have the transaction conducted, comprising:

a service switching point (SSP)

for receiving a communication from the user, and for obtaining and acting on instructions regarding the communication; a service control point (SCP)

for providing the instructions regarding the communication to the SSP, the instructions instructing the SSP to retrieve transaction information and to forward the transaction information to the SCP, for including the transaction information in a billing message for billing telephone network service usage to the user by assigning the transaction information to at least a field of the billing message by reusing the at least a field of the billing message, and for posting the billing message for retrieval by a billing system; and the billing system for retrieving the billing message, for recognizing the transaction information in the billing message, and based on the recognition, for conducting the transaction based on the transaction information, wherein:

the SCP is operative to code the transaction amount into a field of the billing message and the account number into another field of the billing message;

the billing system is operative to decode the transaction amount from the field of the billing message and account number from the another field, and to credit or debit an account by the transaction amount, the account associated with a recipient other than the user; and the fields of the billing message are designed for holding information for billing telephone service usage; and the system reuses at least one field to hold transaction information that is not pertinent for billing telephone service usage.

47. The system of claim 46, wherein the billing message is a Structure Code 223, Automatic Messaging Accounting (AMA) billing record.

*48. A computer-readable medium containing processor-executable instructions that, when executed by one or more processors, cause the one or more processors to execute a method for executing a transaction with respect to an account, the method comprising:*

*receiving a communication on a calling line associated with a calling line number;*

*obtaining an account number and a transaction amount from the communication, the account number corresponding to an account with respect to which a transaction is to be conducted, the account associated with a recipient other than a subscriber associated with a calling line number account associated with the calling line number;*

*creating a billing message for billing telephone service usage with respect to the calling line number;*

*reusing a plurality of fields in the billing message to hold elements of transaction information, the transaction information including the account number, the transaction amount, and the calling line number; and*

*using the account number and the transaction amount from the billing message to execute the transaction with respect to the account corresponding to the account number, wherein the plurality of fields in the billing message are designed for holding information for billing telephone service usage, and wherein the plurality of fields are reused to hold transaction information that is not pertinent for billing telephone service usage.*

*49. The medium according to claim 48, wherein the communication is directed to a special access code.*

*50. The medium according to claim 48, wherein the method further comprises:*

*charging the calling line number account associated with the calling line number a fee for the transaction.*

*51. The medium according to claim 48, wherein the method further comprises:*

*providing the communication with an announcement regarding the transaction.*

*52. The medium according to claim 48, wherein the method further comprises:*

*making a validation whose result comprises a determination that the calling line number is authorized to conduct the transaction, wherein said making a validation is performed prior to obtaining the account number and the transaction amount.*

*53. The medium according to claim 52, wherein said making a validation comprises at least one validation procedure selected from the group consisting of:*

*obtaining a personal identification number (PIN) from the communication and checking that the PIN corresponds to a stored PIN associated with the calling line number; and*

*comparing the account number for correspondence to a stored account number associated with the calling line number.*

*54. A computer-readable medium containing processor-executable instructions that, when executed by a processor, cause the processor to execute a method to conduct a transaction with respect to a telecommunications account in a telecommunications system, the method comprising:*

*obtaining a billing message generated as a result of a telecommunications service performed with respect to a calling line number, wherein at least one field of the billing message for billing telephone service usage with respect to the calling line number is reused to hold transaction information;*

*in response to obtaining the billing message, making a determination that the billing message includes an indication that a transaction is conducted with respect to a telecommunications account in the system, the telecommunications account associated with a recipient other than the subscriber associated with a calling line number account associated with the calling line number; and*

*in response to the determination, conducting the transaction with respect to the telecommunications account, wherein the plurality of fields in the billing message are designed for holding information for billing telephone service usage, and wherein the plurality of fields are reused in the obtaining step to hold transaction information that is not pertinent for billing telephone service usage.*

*55. The medium according to claim 54, wherein conducting the transaction with respect to the telecommunications account comprises:*

*crediting the telecommunications account by at least a number of units or a dollar amount and/or debiting a different telecommunications account by at least the number of units and/or by at least the dollar amount, the different telecommunications account being associated with the calling line number receiving the telecommunications service that generated the billing message.*

*56. The medium according to claim 54, wherein the indication comprises the transaction information, and wherein said conducting the transaction comprises using the transaction information with respect to the telecommunications account.*

*57. The medium according to claim 54, wherein the method further comprises:*

*generating an invoice for the telecommunications account, the invoice indicating conduct of the transaction with respect to the telecommunications account.*

*58. The medium according to claim 57, wherein the method further comprises:*

*generating a different invoice for the different telecommunications account, the different invoice indicating the conduct of the transaction with respect to the telecommunications account.*

*59. A computer-readable medium containing processor-executable instructions that, when executed by one or more processors, cause the one or more processors to execute a method for executing a transaction, comprising:*

*receiving a communication associated with a calling line number;*

*obtaining a transaction amount from the communication;*

*coding the transaction amount and the calling line number into a billing message for billing telephone service usage with respect to the calling line number by reusing at least one field of the billing message to hold transaction information;*

*posting the billing message;*

*obtaining the billing message, and decoding the transaction amount and the calling line number from the billing message; and*

*crediting or debiting an account by the transaction amount, the account associated with a recipient other*

*than a subscriber associated with the calling line number, wherein the at least one field of the billing message is designed for holding information for billing telephone service usage, and wherein the at least one field is reused in the coding step to hold transaction information that is not pertinent for billing telephone service usage.*

*60. The medium according to claim 59, wherein the communication is directed to a special access code.*

*61. The medium according to claim 59, wherein the method further comprises:*

*charging the calling line number account associated with the calling line number a fee for the transaction.*

*62. The medium according to claim 59, wherein the method further comprises:*

*providing the communication with an announcement regarding the transaction.*

*63. The medium according to claim 59, wherein the method further comprises:*

*making a validation whose result comprises a determination that the calling line number is authorized to conduct the transaction, wherein said making a validation is performed prior to obtaining the account number and the transaction amount.*

*64. The medium according to claim 63, wherein said making a validation comprises at least one validation procedure selected from the group consisting of:*

*obtaining a personal identification number (PIN) from the communication and checking that the PIN corresponds to a stored PIN associated with the calling line number; and*

*comparing the account number for correspondence to a stored account number associated with the calling line number.*

*65. Apparatus of a telephony system to permit a user to initiate a transaction and have the transaction conducted, the apparatus comprising:*

*a control node to provide instructions regarding a user communication to a second node, the instructions to instruct the switching node to retrieve transaction information and to forward the transaction information to the control node, the control node further to include the transaction information in a billing message for billing telephone network service usage to the user by assigning the transaction information to at least a field of the billing message by reusing the at least a field of the billing message, and for posting the billing message for retrieval by a billing system,*

*wherein the control node is operative to code the transaction amount into a field of the billing message and the account number into another field of the billing message;*

*wherein an account associated with a recipient other than the user is to be credited or debited by the transaction amount;*

*wherein the fields of the billing message are designed for holding information for billing telephone service usage; and*

*wherein at least one field of the billing message is to be reused to hold transaction information that is not pertinent for billing telephone service usage.*

*66. The apparatus according to claim 65, wherein said control node includes a service package application to perform the transaction.*

*67. An apparatus forming part of a telephony system to permit a user of a calling line number to initiate a transaction and have the transaction conducted, the apparatus comprising:*

*a billing system to obtain a billing message to be generated as a result of a telecommunications service associated with the calling line number, wherein at least one data field of the billing message for billing telephone service usage with respect to the calling line number is to be reused to hold transaction information; to make a determination, in response to obtaining the billing message, that the billing message includes an indication that the transaction is to be conducted with respect to an account of the system, the account being associated with a party other than a party associated with the calling line number; and to conduct the transaction, in response to the determination,*

*wherein one or more data fields of the billing message are designed to hold information for billing telephone service usage, and wherein at least some of those data fields are reused to hold transaction information that is not pertinent for billing telephone service usage.*

*68. The apparatus according to claim 67, wherein the transaction is selected from the group consisting of: a transaction to transfer funds from one account to another; an order transaction; a voting transaction; a registration transaction; and a voucher transaction.*

* * * * *